United States Patent
Aaron et al.

(10) Patent No.: US 9,026,266 B2
(45) Date of Patent: May 5, 2015

(54) METHOD FOR CHECKING THE USE OF THE FUNCTIONS OF A PROVIDED VEHICLE

(75) Inventors: Francis Aaron, Houilles (FR); Ruben Rodrigues, Montmorency (FR); Sandrine Ressayre, Auffargis (FR); Clément Lambrinos, Montreuil (FR); Yousra Chebbi, Issy les Moulineaux (FR); Aymeric Augustin, Ville d'Avray (FR); Raphaël Barrois, Paris (FR); Antoine Geron, Viroflay (FR); Sylvain Geron, Meudon (FR)

(73) Assignee: Bluecarsharing, Puteaux (FR)

( * ) Notice: Subject to any disclaimer, the term of this patent is extended or adjusted under 35 U.S.C. 154(b) by 0 days.

(21) Appl. No.: 14/128,977

(22) PCT Filed: Jul. 2, 2012

(86) PCT No.: PCT/FR2012/051525
§ 371 (c)(1),
(2), (4) Date: Dec. 23, 2013

(87) PCT Pub. No.: WO2013/001253
PCT Pub. Date: Jan. 3, 2013

(65) Prior Publication Data
US 2014/0148997 A1    May 29, 2014

(30) Foreign Application Priority Data
Jun. 30, 2011  (FR) .................................... 11 02069

(51) Int. Cl.
*G05D 1/00*    (2006.01)
*G07C 1/00*    (2006.01)
(Continued)

(52) U.S. Cl.
CPC ................ *G05D 1/021* (2013.01); *G07B 15/00* (2013.01); *G07C 9/00896* (2013.01)

(58) Field of Classification Search
USPC ..................... 701/1, 36; 705/5; 180/272, 287; 340/425.5, 426.1, 426.11, 500, 568.1, 340/5.1, 5.2, 5.8, 5.81–5.85
See application file for complete search history.

(56) References Cited

U.S. PATENT DOCUMENTS

| | | |
|---|---|---|
| 5,801,628 A | 9/1998 | Maloney |
| 6,947,881 B1 | 9/2005 | Murakami et al. |

(Continued)

FOREIGN PATENT DOCUMENTS

| | | |
|---|---|---|
| EP | 1170706 A2 | 1/2002 |
| FR | 2819958 A1 | 7/2002 |

OTHER PUBLICATIONS

European Patent Office; Search Report in International Patent Application No. PCT/FR2012/051525 dated Sep. 6, 2012; 4 pages.
(Continued)

*Primary Examiner* — Yonel Beaulieu
(74) *Attorney, Agent, or Firm* — Wood, Herron & Evans, LLP (57) ABSTRACT

The invention relates to a method for checking the use of a vehicle provided to a predetermined user, characterized in that it includes the following steps: a digital means, located in a terminal or in a vehicle connected to said terminal, reads data containing an identifier of said user: said user identifier is sent to a central computer system managing a plurality of vehicles and a plurality of users, in order to compare said user identifier with at least one datum from a user database; and, in the event the vehicle has been provided correctly, said central system sends at least one message enabling a control signal to be sent to a means for controlling at least one function of said assigned vehicle, or an infrastructure to which the latter is connected.

21 Claims, 6 Drawing Sheets (51) Int. Cl.
  *G05D 1/02* (2006.01)
  *G07B 15/00* (2011.01)
  *G07C 9/00* (2006.01)

(56) References Cited

U.S. PATENT DOCUMENTS

7,812,712 B2 * 10/2010 White et al. ............... 340/426.2
8,311,858 B2 * 11/2012 Everett et al. ..................... 705/4
2006/0041513 A1 * 2/2006 Yuhara et al. ................... 705/59
2006/0208924 A1 * 9/2006 Matalon ........................ 340/933
2008/0228365 A1 * 9/2008 White et al. ..................... 701/70
2010/0066513 A1 * 3/2010 Bauchot et al. ............ 340/426.1
2011/0093165 A1 * 4/2011 Miller et al. ..................... 701/36

OTHER PUBLICATIONS

French Patent Office; Search Report in French Patent Application No. 1102069 dated Jan. 5, 2012; 2 pages.

* cited by examiner

METHOD FOR CHECKING THE USE OF THE FUNCTIONS OF A PROVIDED VEHICLE

The invention relates to a method for controlling the use of a vehicle made available to a specified user, characterized in that it comprises the following steps:

reading an item of data representing an identifier of said user by digital means within a terminal or a vehicle connected to said terminal;

sending this user identifier to a central data processing system managing a plurality of vehicles and a plurality of users, for comparing with at least one item of data of a user database;

in the event that a vehicle is validly made available, sending, by said central system, at least one message allowing the sending of a command signal to control means of at least one function of said allocated vehicle, or of an infrastructure to which it is connected.

The invention further relates to such a method in which an identification on the vehicle makes it possible to validate the activation of said functions by comparing this new identification with an identifier previously stored as valid in a memory local to the vehicle.

PRIOR ART

Operation of the various functions of a motor vehicle is often controlled by systems governing the use of the vehicle and preventing unauthorized use of the vehicle.

Thus, in the majority of closed vehicles, access to the interior of the vehicle is controlled by locking the windows, doors or fuel flap, operated by a key. Such a key is a material object that can have various types of functions: in general, mechanical operation by a unique physical profile interacting with a mechanical lock; and often electronic operation for example by communication of the vehicle with an RFID transponder or a smart card.

Starting of the engine and free turning of the steering wheel are in general also dependent on locking means, often the same as for opening the access points, possibly with additional electronic locking for engine starting for example by acquisition of a code or by communication with an RFID transponder or a smart card.

Typically, to make a vehicle available to someone, for example on loan or hire, they are given a key and if necessary the complementary locking code.

For managing a large fleet of vehicles that are made available temporarily, such as for a car hire service, there are systems for storing the keys of the various vehicles, sometimes with means for detecting the presence of each key and means for locking each key in its location, as described for example in document U.S. Pat. No. 5,801,628.

However, the use of these methods of locking has drawbacks. For example, owing to the materiel aspect of the object constituting the locking key, each key is unique and is assigned to a unique vehicle. It is therefore necessary to transport the key to entrust it to a user, and/or to transport duplicates or master keys for the personnel responsible for servicing or moving the vehicles in the fleet. Moreover, the use of complementary locking codes causes an additional problem, since a code can easily be disseminated to numerous unauthorized persons without the managers being aware of this immediately.

The problem is even more complicated when the vehicles can be returned by the users and left at locations different from where they were picked up, and/or when these vehicles in addition have recharging functions that are associated with the presence of a charging terminal.

In the context of a fleet of vehicles operating as self-service, said management can moreover present additional problems, for example because these vehicles are intended to be both personalized temporarily, for a length of time that is sometimes very short, such as less than a day or even less than one or two hours, while remaining interchangeable from place to place and from user to user.

A purpose of the invention is to overcome the aforementioned drawbacks, and in particular:

simplify and safeguard the management and control of the various vehicles made available for example at the start and at the end of an allocation period;

make this management more accurate and more flexible;

simplify and distribute the work of the operators responsible for managing or moving or servicing the vehicles;

and allow the management of various service possibilities, in particular by opening up the ability to adapt usage monitoring by the time of use or the type of contract;

limit the risks at the interface between management of the vehicles and safety of the users or the environment of the vehicles.

DISCLOSURE OF THE INVENTION

The invention proposes a method for controlling the use of a vehicle, in particular a motor vehicle, made available to a specified user, characterized in that it comprises the following steps:

reading an item of data representing an identifier of said user by digital means within a terminal or a vehicle connected to said terminal comprising means for communicating with a central data processing system managing a plurality of vehicles and a plurality of users;

sending this user identifier by digital means to said central data processing system;

comparison of said user identifier by said central data processing system with at least one item of data of a user database;

in the event that this comparison supplies a result validating the making available of the vehicle called allocated vehicle to the user, sending, by said central system, of at least one message, called validation message, allowing a command signal to be sent to the control means of at least one function of said allocated vehicle, or of an infrastructure to which it is connected.

The command signal can be generated immediately or with a delay.

The message sent by the central system can in particular comprise the command signal.

As a variant, the message comprises data that are then read by the vehicle. Reception of these data triggers generation of the command signal by a control unit of the vehicle.

It should be noted that the central system can send a plurality of different data, each triggering the activation of a different predetermined command signal. Certain data can also be stored in the vehicle's memory, for example in the memory of the control unit, which holds these data following reception of the validation message or following generation of the command signal.

The invention thus allows certain vehicle functions to be made dependent on the immediate state of validity of the identifier of the user who is trying to activate these functions. This manner of operation makes it possible to safeguard, and make considerably more flexible, the management and control of a great many vehicles in parallel, in particular in the context of a short-term or very short-term hire service.

This validation by identification and communication with the central system can be carried out for different types of functions, for example for locking and unlocking the doors and windows. The user then uses an identity card supplied by the hire company in the same way that he would use a remote control or a digital activation card with a privately owned vehicle.

Depending on the configuration, communication with the central system can take place for certain types of operations. It can also take place at each activation, or only on certain occasions.

According to a particular feature of the invention, the validation message is transmitted to a control unit within the allocated vehicle and triggers storage of said user identifier as a valid user identifier, in storage means of said control unit, for example in a memory location dedicated to the identifier of a currently valid user or even of several valid users.

According to this particular feature, the method according to the invention can further comprise at least one iteration of an activation operation comprising the following steps:
  reading a user identifier item of data, within said vehicle, by reading means communicating with the control unit;
  validation of this identifier item of data by comparing with the valid identifier item of data stored in said control unit;
  depending on the result of this verification, sending, or not sending, by said control unit, of at least one command signal, called identification command signal, to control means of at least one function of said vehicle or of an infrastructure to which it is connected.

Thus, once the user has been identified for the first time for example at a rental terminal, activations of vehicle functions by identification local to the vehicle (passing the card or badge over the reader) can be carried out more quickly and more reliably since they no longer require making a remote wireless connection.

According to another particular feature, reception of the validation message also triggers storing of a state of authorization of engine starting in storage means of the control unit.

It is thus possible to manage, for engine starting, a level of authorization dissociated from the other vehicle functions.

Various other particular features can be implemented within one and the same embodiment, together or separately, and for example the following particular features.

According to a particular feature, the command signal generated, in particular the identification command signal, interacts with at least one lock of the vehicle to allow opening or closing of the doors. It can also interact with the lid on the compartment housing the vehicle's electrical connector. The vehicle can comprise one or more readers, and identification of a user on a reader can activate one or more command signals, with each reader being able to activate signals that are partially or completely different from the signals activated with the other readers.

According to another particular feature, the command signal generated interacts with the circuit for starting or authorization of starting (anti-starting system); or directly with the engine to allow starting of the vehicle. Starting of the vehicle can be made dependent on a plurality of necessary conditions that are verified together or separately to allow departure: user validation, state of authorization of starting as noted above, state of a starting means such as a key (preferably captive in the lock) or starting button, and possibly other conditions relating to the states of different elements of the vehicle.

According to another particular feature, de activation of the anti-starting system can also automatically activate certain other vehicle functions, for example, lighting up of an on-board PC, on the vehicle or forming an interface between the user and an information site for management of the fleet, also called central site or central agency.

According to another particular feature, if the activation operation relates to opening or closing of the doors, the vehicle's control unit performs a predetermined test on the status of the locks before activation of the command signal, and activates the command signal according to the result of this test. Certain additional conditions can then be verified as a function of the state of the vehicle. For example, it is possible to test whether the vehicle is in driving mode, and not accept locking of the doors if applicable.

The central system can, in addition to the data sent following identification, send data spontaneously, for example when an event occurs in the system to which the vehicle does not have access. Such an event can be for example notifying the vehicle that rental by the user has ceased (when he indicates at a station that he wishes to return the vehicle, for example by presenting his means of identification at this station). This spontaneous event can also be a warning relating to the recharging terminal to which this vehicle is temporarily connected or associated or supplied by this terminal, for example a warning of unavailability of the terminal.

According to another particular feature, the method also comprises verification of the identifier read relative to one or more identifiers called back-up identifiers (or universal identifiers), which are stored in storage means of the vehicle's control unit. This back-up identifier can be associated for example with a card of an operator of the rental service. It allows these operators to have access to the vehicles even when the network linking the vehicle to the central agency is temporarily and/or locally inaccessible.

According to another aspect of the invention, a method is proposed for managing a fleet of motor vehicles made available to a plurality of users, and comprising monitoring of each of said vehicles by said monitoring method.

According to another aspect of the invention, a vehicle is proposed comprising at least one control unit arranged for communicating with an information system for managing a plurality of vehicles, characterized in that the control unit is connected within the vehicle to:
  user identification means accessible from the outside without opening said vehicle;
  means for wireless communication with said management information system, in particular by wireless digital telephony such as GPRS;
  control means of one or more functions of said vehicle;
  optionally, means for detecting the state of one or more elements of said vehicle,
said control unit being configured for implementing a monitoring method as described above.

According to a particular feature of the invention, such a vehicle further comprises control means of one or more functions of said vehicle, which are arranged so that they can only be activated by an operation of activation according to said monitoring method.

It is thus possible to obtain a higher frequency of monitoring of use.

According to another aspect of the invention, an installation is also proposed comprising at least one vehicle according to the invention, preferably a plurality of such vehicles, and a central system managing said vehicles.

BRIEF DESCRIPTION OF THE DRAWINGS

Various embodiments of the invention are envisaged, incorporating the different optional features disclosed here in all of their possible combinations.

Other advantages and characteristics of the invention will become apparent on examination of the detailed description of an embodiment which is in no way limitative, and the attached diagrams, in which.

DETAILED DESCRIPTION

The invention is described here in the context of its application in a car sharing system, which offers short-term rental of motor vehicles of the private car type. This system is intended for offering this rental in self-service conditions, interchangeably between different stations distributed within a predetermined operating zone, and in which all the vehicles can be picked up at one station and left at another, as required.

The invention can, however, be implemented in systems or services that are more or less similar or different from that described here.

Figure 1:
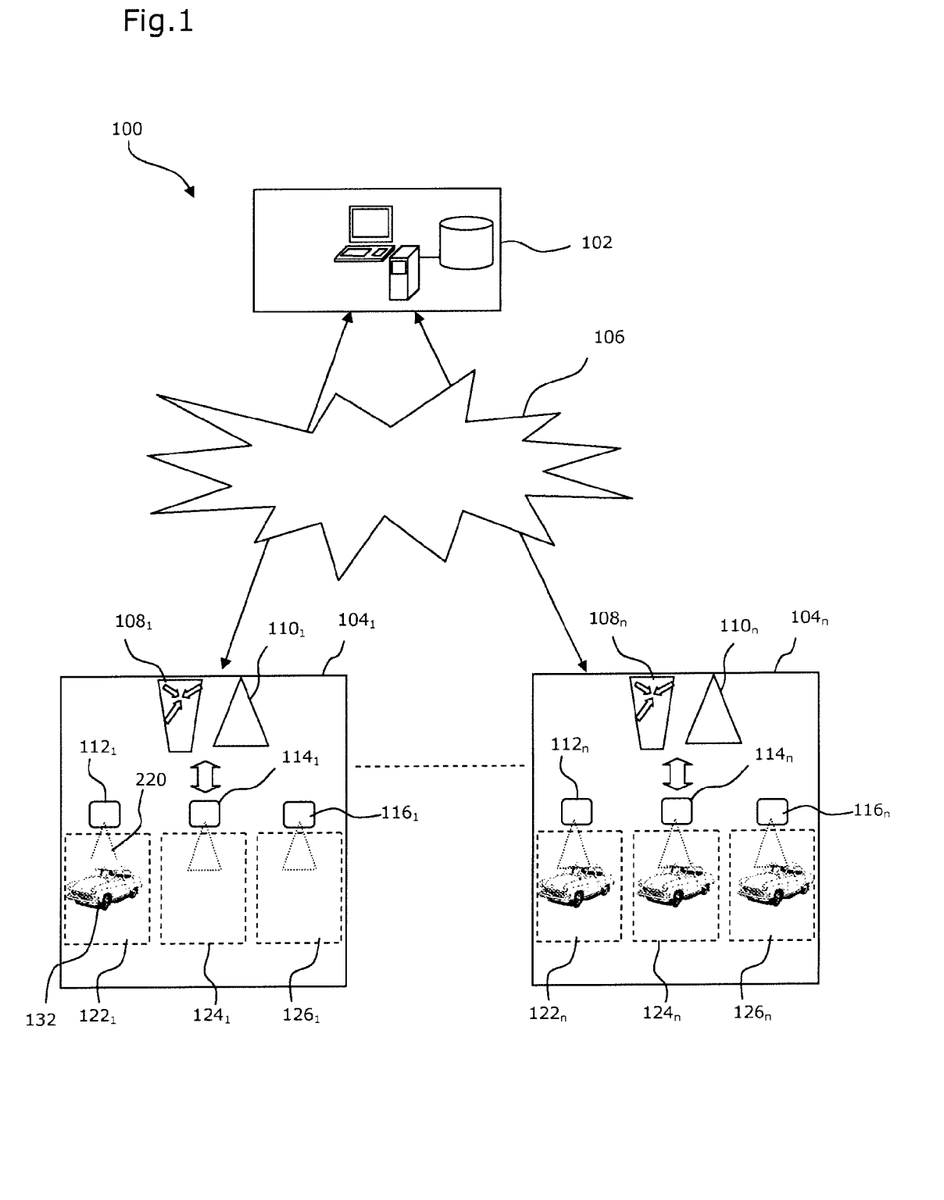
FIG. 1 shows diagrammatically an example of a system for overall management of a fleet of electric vehicles offered for rental.

FIG. 1 shows diagrammatically a system for overall management of such a fleet of electric vehicles offered for rental and corresponding stations.

The system 100 shown in FIG. 1 comprises a central information site 102 (also called central agency in the rest of the description) connected to several rental sites $104_1$-$104_n$, or stations, via a communication network 106 for example by ADSL or wireless such as GPRS.

The central site 102 can be connected directly to each of the terminals of a rental site 104 via the network 106 or only to the subscription terminal and/or to the rental terminal and/or to the recharging terminals 112-116.

Each rental site 104 comprises a rental terminal 110 with tactile and audible information interface, and can further comprise a subscription terminal 108 for registering a new subscriber or renewing a subscription contract.

The different elements of the system communicate with one another, in particular by means of a GPRS network. Thus, all the vehicles, rental terminals and the central site are equipped with GSM chips, and the central site communicates with the rental terminals 110 and with the subscription terminals 108 by an ADSL and/or Internet network.

At least two stations of one and the same rental site are linked together via a local connection, preferably by wire (not shown) and for example RS422.

Typically, the rental terminal 110 collects all the information relating to the station 104 to which it belongs, and is equipped with wire or wireless telecommunication means for communicating with the central site 102.

Each recharging terminal 112-116 is associated with a parking space 122-126 of the station 104, and thus allows charging of the batteries of the vehicles 132 at these locations (for example for an electric or hybrid vehicle).

The central site 102 is arranged for connection by wireless network, for example GPRS, to each of the vehicles 132, which comprise a data connector with one or more elements of the vehicle and/or an interface for communication with the user. Each vehicle can further comprise an interface allowing the user to communicate with the central site 102 or with a human operator.

The central site 102 is also arranged for exchanging data with a portable communication device such as a PDA, a mobile phone, etc.

The system comprises a user interface, for example in the central site 102, which allows human operators to use this central site 102 for managing a plurality of vehicles each comprising a control unit able to communicate with the central system 102 and with various units of the vehicle.

The users can interact with the various terminals as well as with the various elements of the vehicles. Moreover, the vehicle rental service with the system according to the invention can operate by means of mobile operators, each equipped with a mobile terminal such as a PDA, who can intervene in the service as "super-users".

The central site 102 of the system comprises a subscriber database and means for comparing a predetermined number supplied for example by a rental terminal 110 or a subscription terminal 108, or by a vehicle 132, with the database.

In the context of a system such as that envisaged for implementing the service according to the invention, for example for a car sharing service, the method of making a vehicle available to a user (service subscriber) comprises for example the following steps:

identification of a user at a terminal or a vehicle (in particular by reading a means of identification);
  verification, with a central agency of the system, that the means of identification is valid, for example by comparing with a list of subscribers or of contracts in a database managed by the central site 102, or by comparing a secret common item of data between the user's means of identification and an item of data calculated or stored by the central site or by the vehicle;
  if the user is a valid user at the moment of identification, immediate or delayed activation of a command signal that interacts with at least one unit of the vehicle or with another element of the system, such as the recharging terminal 122 to which the vehicle is connected. This command signal can be activated directly by the central agency, or more generally by a control unit of the vehicle after receiving data from the central agency.

Figure 2:
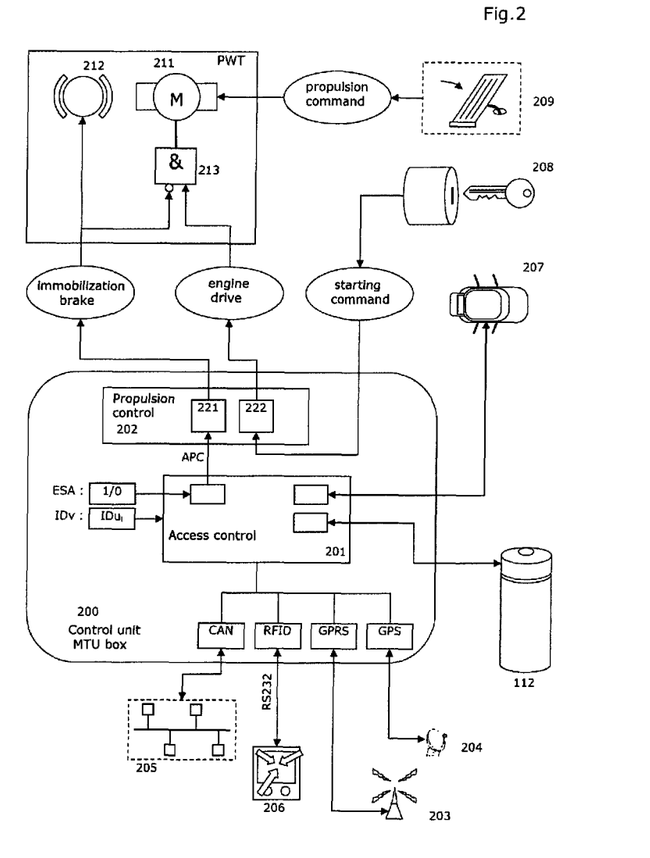
FIG. 2 shows diagrammatically some of the functional links that exist within a control unit of a vehicle managed according to the invention, and between this control unit and its environment.

As shown in FIG. 2, the vehicle is equipped with an identification reader, for example a reader 206 of the RFID type, or a smart card reader, or a barcode reader, or even possibly a local radio receiver such as Bluetooth or an input keyboard. The RFID reader can be bonded on the vehicle body, in particular on the inside of its windscreen, where it is easily visible and accessible for the user. It also comprises a signalling element, for example a light signal by one or more LEDs or colours of LEDs. This signalling element is used for indicating the state of the reader, for example to indicate whether the reader is in operation or not, and/or whether the user is validated or not, and possibly for activating some function.

The vehicle comprises an antenna 203 for communication by GPRS digital telephony, allowing communication of the vehicle with the central agency 102. It can in particular comprise two antennas positioned on either side of the dashboard to ensure better data transmission.

The vehicle comprises a control unit 200—or MTU3 box. This control unit 200 is connected in particular: to the reader 206, to the antenna 203, to the CAN ("Controller Area Network") bus 205 of the vehicle to obtain information on the state of the various units of the vehicle, and to certain devices of the vehicle such as the actuators 207 for locking the doors and windows to allow these to be controlled. The control unit comprises means for numerical calculation and information processing, and forms the interface between these various elements. The control unit can also comprise means for data storage. It should be noted that this control unit is preferably positioned at a location of the vehicle where it is not easily accessible, from outside the vehicle and/or from the interior.

Inside the control unit 200, a functional module for monitoring access 201 communicates in particular with the central system 102 by GPRS 203, with various units of the vehicle by the CAN ("Controller Area Network") bus 205, with system 207 for locking and for detecting opening of the doors and boot and connection lid, with one or more RFID identification readers 206, and with a GPS module or one or more GPS antennas 204. Optionally, this module 201 can also communicate with the recharging terminal 112, for example by a pilot-wire of the connecting cable used for recharging.

This module for monitoring access 201 receives and uses various data originating from the units of the vehicle for determining whether the latter can be authorized to move. For this, it verifies the stored value for an ESA ("Engine Start Authorization") item of data stored in the control unit 200. If the stored ESA value allows the engine to be started, it also verifies certain other parameters and states of the vehicle and generates a signal called APC signal which represents a general authorization for driving the vehicle, from the standpoint of management of the vehicle by the supplier of the providing service. This signal can be designated as a command signal for authorization of driving.

This APC signal is transmitted to a propulsion control module 202, the outputs of which are connected to the functional inputs of the powertrain PWT of the vehicle.

In a typical configuration, this vehicle is a production vehicle such as is usable directly by an individual outside of any fleet management or car service.

In the configuration described here, the powertrain PWT of this vehicle comprises:
- an "Immobilization" input which activates immobilization of the vehicle and/or of the engine, for example the parking brake and/or anti-starting, anti-theft function 212; and
- a "Crank" input which activates the driving engine, for example via the starting or placing in running order of the engine 211 triggered manually by the user, the power delivered then being adjusted by an acceleration control such as an accelerator pedal 209.

This powertrain PWT in this case further comprises a logic stage 213, which ensures that the engine 211 can only be started (or can only deliver its power) if the immobilizer is deactivated.

In this configuration, the propulsion control module 202 comprises a first relay or a relay stage 221 which is controlled in binary by the command signal APC from the access control functional module. Its output is connected to the "immobilization" input of the powertrain PWT, and thus controls deactivation of immobilization when general authorization for driving the vehicle is supplied by the access control module 201.

The propulsion control module 202 comprises a second relay or a relay stage 222 which is controlled in binary by a command signal from the unit controlling starting of the vehicle, for example a key-operated starting lock 208 or any other standard device such as a starting button. The output of this second relay 222 is connected to the "engine" input of the powertrain PWT, and thus controls activation of the engine when the driver operates the starting control in a way that is standard for the type of vehicle in question.

Other powertrain configurations can also be envisaged in the context of the invention. For example, in a configuration without internal logic, a logic stage of this kind can be integrated in the control unit 200.

The logic stage can also be configured in such a way that the engine activation command is dependent on a value of the command signal APC that represents a general authorization for driving, for example in another configuration where the powertrain does not have an electrical input controlling immobilization.

It can thus be seen that the vehicle used can be of a standard type intended for standard private use, and can be integrated simply and economically in a fleet of vehicles managed for being made available to multiple users, especially for a short time and for trips from point to point without returning to the starting point.

Figure 3:
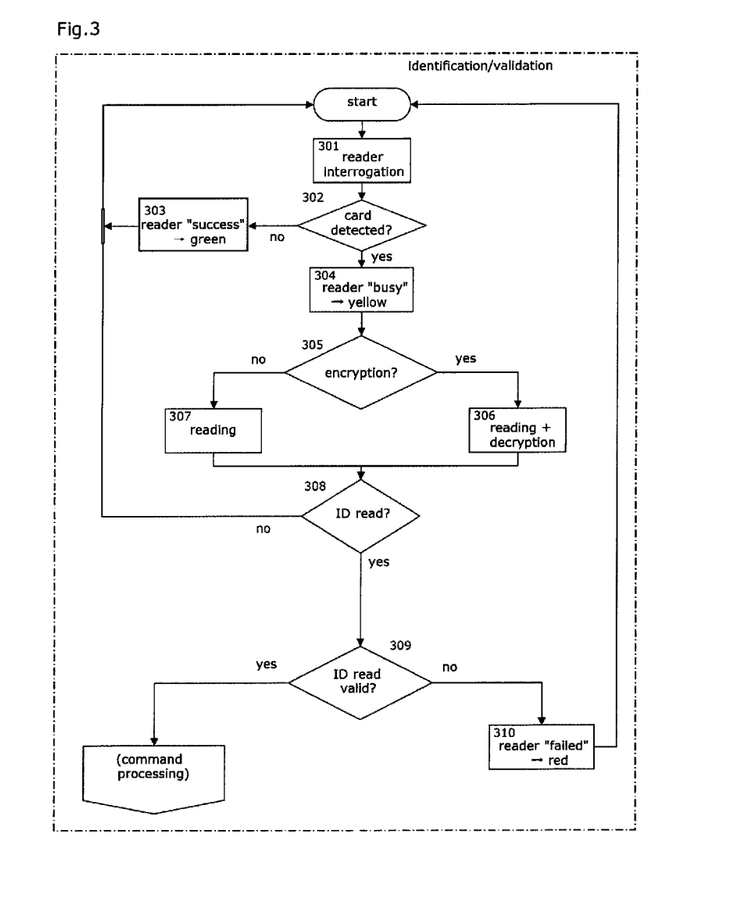
FIG. 3 and FIG. 4 show two parts of a diagrammatic flow-chart showing the method according to the invention, in an embodiment example comprising local storage of a valid user identifier and of an engine authorization.
Figure 4:
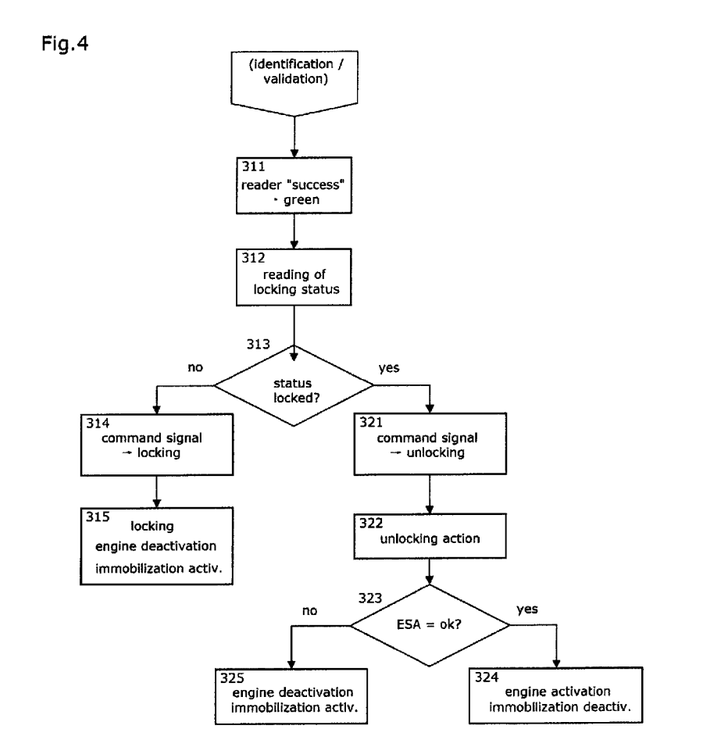

FIG. 3 and FIG. 4 form two parts of a diagrammatic flowchart showing one part of the method according to the invention, in an example of a particular embodiment of the invention in which a validation message is sent by the central system to the vehicle, before the method described below, during rental validation that triggers storage of a valid user identifier IDv and of an engine authorization ESA in the control unit 200 of the vehicle 132.

It should be noted that other variants are possible. The vehicle might, for example, only communicate with the central system for identifying a user when the user has already presented his means of identification to the vehicle. In such an example, the central system sends the validation message to the vehicle only when this is requested by the vehicle, for example when the user identifies himself to the vehicle for the first time after triggering rental on the rental terminal.

The activation of locking of the doors and management of engine starting are then managed by reading and identification at the RFID reader 206 of the vehicle and validation that is local to the vehicle, as shown in this flowchart.

The control unit or "MTU" regularly interrogates 301 the reader 206, for example every 500 ms, on a permanent, 24/7, basis. The MTU updates the status of the reader by sending the status value with the next event, in such a way that the users can always see whether the reader is operating. As long as no card is detected, a "success" instruction is transmitted 303 to the reader, which continues to display "available", for example in green.

When a card is detected 302, the reader reads the identifier of the chip of the identity card and stores it for later use. The MTU sends 304 a "busy" instruction to the reader, which displays "occupied", for example in yellow. The value of the read parameter is tested 305 in the MTU. If the value indicates encryption, the MTU sends 306 an instruction for reading and decryption to the reader, otherwise it sends 307 an instruction for simple reading.

If the reader reads a user identifier in the chip on the card, it checks 309 whether this user identifier is valid for this vehicle, by comparing with the memory location for valid user identifier IDv, or with one or more memory locations permanently containing the identifiers of one or more "super-users" representing for example operators of the service.

If the user identifier read is not valid, the MTU sends 310 a "failed" instruction to the reader, which displays "error" for example in red. Optionally, the MTU can store, and/or send to the central system 102, an item of information representing rejection of the request.

If the user identifier read is valid, the MTU sends 311 a "success" instruction to the reader, which displays "available" for example in green. Optionally, the MTU can store, and/or send to the central system 102, an item of information representing identification of a valid user.

The MTU detects 312 the current state of locking of the vehicle openings, for example by a request sent to the vehicle via the CAN bus.

If the current state is unlocked, the MTU sends 314 to the vehicle a command signal for locking the doors and windows, and the vehicle then executes 315 the actions of locking the doors and windows 207. Of its own accord as a result of locking, or as a result of a command signal APC received from the MTU and indicating "prohibited", the powertrain PWT executes the actions of deactivation of the engine 211 and activation of the anti-starting system 212.

If the current state is locked, the MTU sends 321 a command signal for unlocking the doors and windows and the vehicle unlocks 322 the doors and windows 207.

The MTU then tests 323 the value of the item of data for authorization of engine starting in the memory location ESA corresponding to the memory location of valid use identifier IDv that has been accepted. Typically, this item of data ESA always has the value "authorized" for the super-users, and is reset to "prohibited" for the users once the rental has ended.

If the item of data ESA indicates authorization, the MTU sends 324 a command signal for authorization APC indicating "authorized" to the vehicle, and the powertrain PWT executes the actions of activation of the engine 211 and of deactivation of the anti-starting system 212.

If the item of data ESA does not indicate authorization, the MTU sends 325 a command signal for authorization APC indicating "prohibited" to the vehicle, and the powertrain PWT executes the actions of deactivation of the engine 211 and of activation of the anti-starting system 212.

Thus, it can be seen that the user can no longer start if the rental has ended, but can still lock or unlock the doors and windows until his user identifier $IDu_i$ has been erased from the memory IDv of the vehicle, for example during storage of the user identifier $IDu_{i+1}$ of a new user $U_{i+1}$ for a new rental.

It should be noted that mutual exclusion is in this case performed automatically 213 within the powertrain PWT between activation of the anti-starting system 212 and activation of the engine 211. In other configurations of the powertrain that might not provide said mutual exclusion, the MTU can be arranged to perform this itself and systematically send two command signals giving the necessary instructions separately to the engine 211 and to the anti-starting system.

Figure 6:
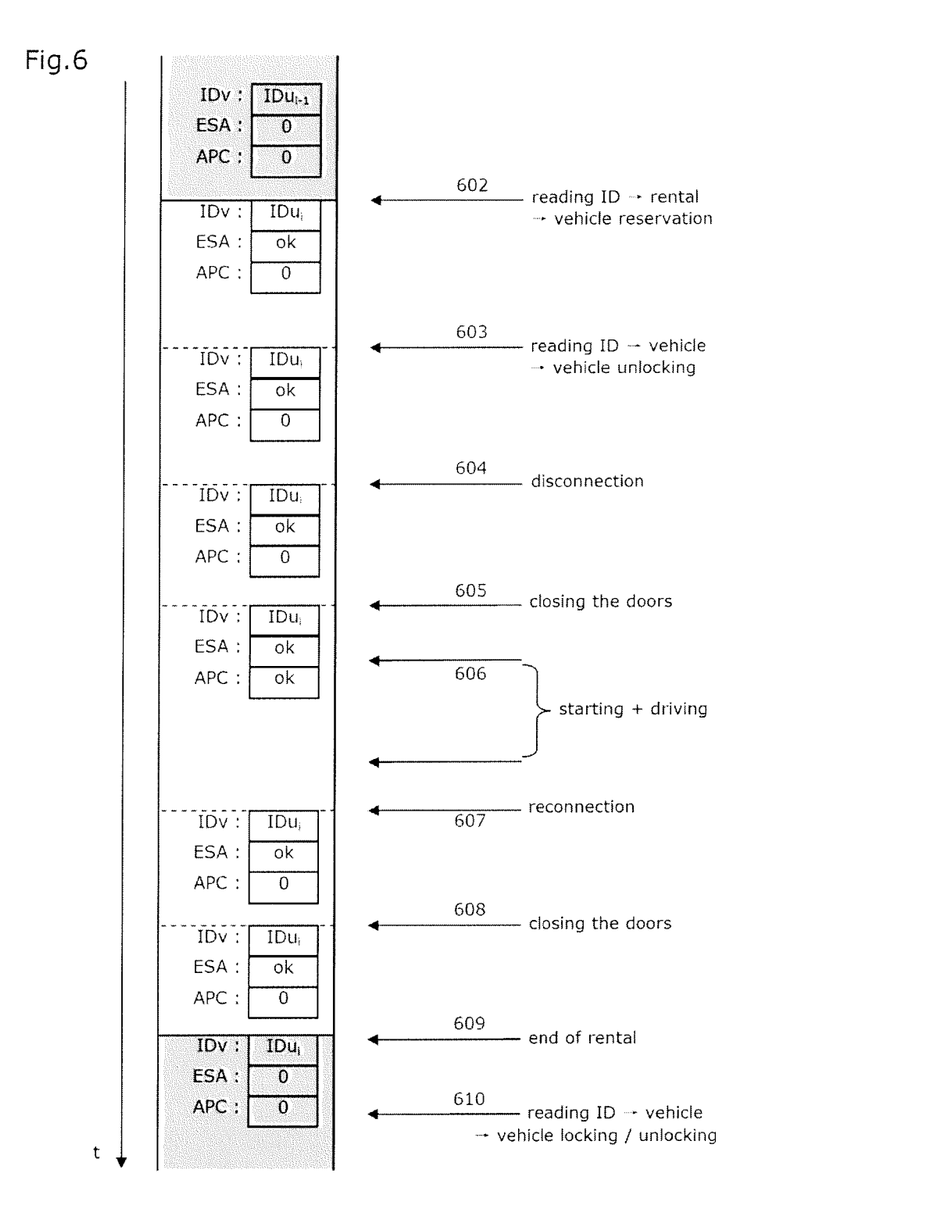
FIG. 6 is a timing diagram showing an example of a possible operating cycle of a vehicle managed according to the invention.

FIG. 6 is a time line showing an example of a possible operating cycle of a vehicle managed according to the invention.

Before the arrival of a new user $U_i$, an available vehicle 132 is stored at a location 122 and is connected to its recharging terminal 112 (period shown in grey in FIG. 6). In the memory of its control unit 200, the valid user memory location IDv contains the value $IDU_{i+1}$ corresponding to the last user of this vehicle, or no value. The memory location of engine authorization ESA contains an inhibit value (here "0").

A new user $U_i$ uses 602 an identification object or an identity card to identify himself by communication with a reader of a rental terminal $110_i$, or possibly of a vehicle, and to obtain access to an available vehicle situated at a location $124_i$, preferably in the local station $104_i$. If necessary, the system can allocate to him a vehicle that is present in another station $104_n$ near to his present location.

Once he has been allocated a vehicle 132, the central system 102 communicates with the control unit 200 of the allocated vehicle and transmits to it the identifier $IDu_i$ of this user $U_i$, thus reserving this vehicle for this user. This user identifier $IDu_i$ is then stored in the control unit of the reserved vehicle as a valid user identifier, in the storage means IDv. Simultaneously, or possibly after a certain delay depending on the conditions of the rental contract, the central system 102 also sends the control unit a signal for engine authorization, which is stored by modifying the value of the item of data for engine authorization ESA, for example by setting it to the value "1" or "ok".

Optionally, the vehicle in question can emit a visual or audible information signal, enabling the user to locate it more easily. For the same reasons, the rental terminal 110 can also send a signal to the recharging terminal 112 to which this vehicle 132 is connected, and this recharging terminal displays an information signal, for example a flashing blue light.

On arrival at the vehicle that is reserved for him, the user uses the same identity card or the same identifier $IDu_i$ to identify himself 603 by communication with the reader 206 of this vehicle, for example through the windscreen.

The control unit verifies that the identifier $IDu_i$ read by the reader 206 of the vehicle is indeed the same as that stored in its memory of valid user identifier IDv, and generates a command signal for unlocking 207 the doors and the connection lid of the vehicle.

The user disconnects 604 the recharging cable that connected the vehicle and the recharging terminal 112.

The user closes 605 the vehicle lid again, gets into the vehicle and closes 605 the doors.

Repeatedly, or when the user operates the starter 606, the control unit verifies that the vehicle is in working order and for example that the doors and windows are closed and that the valid user identifier has not been modified by the central system 102 and that the engine authorization value is still "ok", and generates a general authorization signal APC with the value "ok" or "1".

The user then operates 606 the engine starter, and then begins a travelling phase.

Figure 5:
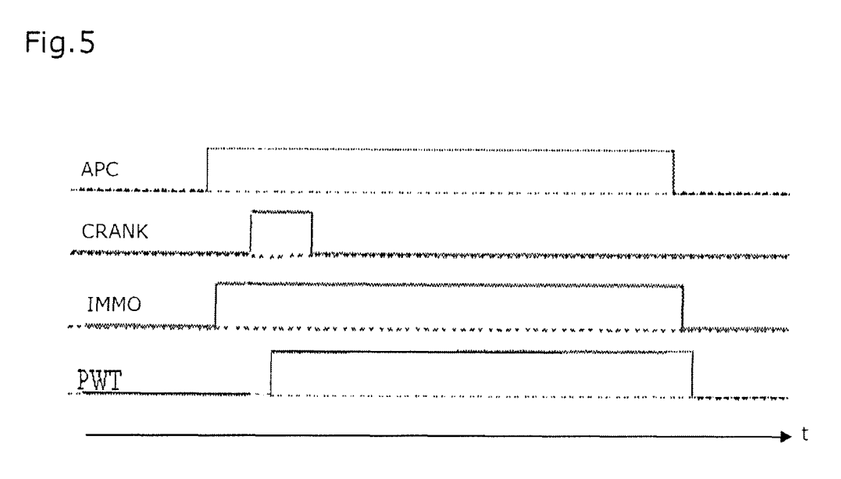
FIG. 5 is a diagrammatic diagram showing activation of the powertrain in the same embodiment example of the invention.

FIG. 5 shows the sequence of starting 606 of the engine 211, with a timeline showing (from top to bottom) the respective states of:
  the command signal APC for general authorization,
  the input "CRANK" for engine activation of the powertrain PWT,
  the input "IMMO" (immobilization) of the powertrain PWT, as well as
  the signal "PWT" for effective engine activation at the end of the logic stage 213.

It will be noted that there is a grey vertical bar, which indicates a time delay that can be defined in the logic or in the mechanism of the powertrain.

When the user no longer needs the vehicle, he reconnects it 607 to any recharging terminal at a location within any station of the total system 100. To do this, he can for example identify himself on the reader of the charging terminal, which then unlocks its connection lid.

At any moment while the vehicle is in use, when a door or the connection lid of the vehicle is open, the control unit generates an authorization command signal APC with the value "0", or "prohibition".

The user identifies himself 608 on the vehicle to lock the doors, then he declares 609 the end of rental on the nearest rental terminal. The latter informs the central system 102, which communicates with the vehicle's control unit to alter the value of its item of data for engine authorization ESA to "0", i.e. "prohibition".

From this moment, calculation of the conditions for general authorization for driving will supply a prohibition result, for example by a command signal APC at zero. It will thus no longer be possible for the engine to be started or restarted.

It should be noted that the user identifier $U_i$ can be kept in the valid user memory Uv, for a predetermined time, or until a deliberate operation of reinitialization by an operator, or until the next time the vehicle is made available to a user. It is thus possible for the last user to control certain vehicle functions after the end of the rental, and in particular for locking or unlocking the doors to gain access to interior of the vehicle to recover any objects or persons that might still be there.

Of course, the invention is not limited to the examples which have just been described and numerous adjustments can be made to these examples without exceeding the scope of the invention.

The invention claimed is:

1. A method for controlling the use of a vehicle, in particular of a motor vehicle, made available to a specified user, characterized in that it comprises the following steps:
    reading an item of data representing an identifier of said user by digital means within a terminal or in a vehicle connected to said terminal comprising means for communicating with a central data processing system managing a plurality of vehicles and a plurality of users;
    sending this user identifier by digital means to said central data processing system;
    comparison of said user identifier by said central data processing system with at least one item of data of a user database;
    in the event that this comparison supplies a result validating the making available of said allocated vehicle to said user, sending, by said central system, of at least one message allowing the immediate or delayed sending of at least one command signal to the control means of at least one function of said allocated vehicle, or of an infrastructure to which it is connected, wherein said message comprises engine starting authorization data; and
    storing said engine authorization data in storage means in said vehicle.

2. The method according to claim 1, characterized in that the message is transmitted to a control unit within the allocated vehicle and triggers storage of said user identifier as a valid user identifier, in storage means of said control unit.

3. The method according to claim 2, characterized in that the storage of the user identifier as a valid user identifier, in storage means of the control unit is carried out by replacing a valid user identifier of a preceding user.

4. The method according to claim 2, characterized in that it further comprises the following steps:
    reading a user identifier item of data, within said vehicle, by reading means communicating with the control unit;
    validation of this identifier item of data by comparing with the valid identifier item of data stored in said control unit;
    depending on the result of this verification, sending, or not sending by said control unit, of at least one command signal, called identification command signal, to control means of at least one function of said vehicle or of an infrastructure to which it is connected.

5. The method according to claim 1, characterized in that the control unit generates a command signal for general authorization for driving which depends on the value of the state of authorization of engine starting stored in said control unit.

6. The method according to claim 1, characterized in that it further comprises a step of verification of at least one state of the vehicle or of the infrastructure to which it is connected, said verification also determining the sending of the command signal.

7. The method according to claim 1, characterized in that the or at least one signal triggers means for locking or unlocking of at least one access to an interior region of the vehicle.

8. The method according to claim 1, characterized in that the at least one command signal generates a signal for starting a powertrain and/or deactivation of means for immobilizing the vehicle or at least one powertrain.

9. The method according to claim 1, in which, after the reading step, the method comprises a step of validation of the identifying item of data by comparison by the vehicle of the item of data read with a universal identification item of data stored permanently in the storage means of the control unit, and, depending on the result of this verification, a step of sending, or not sending, at least one command signal to control means of at least one function of said vehicle or of an infrastructure to which it is connected.

10. The method of managing a fleet of motor vehicles made available to a plurality of users, characterized in that it comprises control of each of said vehicles by a method of control according to claim 1.

11. A vehicle comprising at least one control unit arranged for communicating with an information system for management of a plurality of vehicles, characterized in that the control unit is connected within the vehicle to:
    user identification means accessible from the outside without opening said vehicle;
    means for wireless communication with said management information system;
    control means of one or more functions of said vehicle, said control unit being configured for:
        reading an item of data representing an identifier of a user,
        sending the user identifier to the information system,
        receiving a message comprising engine starting authorization data from the information system, and
        storing the engine authorization data in storage means in the vehicle.

12. The vehicle according to claim 11, characterized in that it comprises control means of one or more functions of said vehicle, which are arranged so that they can only be activated by an operation of activation according to claim 1.

13. A installation comprising a vehicle according to claim 11 and a management information system comprising means for wireless communication with the vehicle and storage means comprising at least one user database.

14. The method according to claim 5, wherein generating a command signal for general authorization for driving depends on detecting a command for starting by the user or on generation of a command signal for changing the state of locking of the doors and windows.

15. The method according to claim 6, wherein said verification determines the sending of the identification command signal or signal for authorization for driving.

16. The method according to claim 7, wherein the identification command signal triggers means for locking or unlocking of at least one access to an interior region of the vehicle.

17. The method according to claim 7, wherein the at least one signal in triggers means for locking or unlocking the passenger compartment and/or an access lid to means for connection to a power recharging terminal.

18. The method according to claim 8, wherein the command signal for authorization of starting generates a signal for starting a powertrain and/or deactivation of means for immobilizing the vehicle or at least one powertrain.

19. The method according to claim 8, wherein the at least one command signal generates a signal for starting all the powertrains and/or deactivation of means for immobilizing all the powertrains.

20. The method according to claim 9, wherein the step of sending or not sending at least one command signal to control means of at least one function of said vehicle or of an infrastructure to which it is connected comprises sending or not sending an identification command signal.

21. The vehicle according to claim 11, wherein the means for wireless communication with said management information system comprises wireless digital telephony.

\* \* \* \* \*

UNITED STATES PATENT AND TRADEMARK OFFICE
CERTIFICATE OF CORRECTION

| | | |
|---|---|---|
| PATENT NO. | : 9,026,266 B2 | Page 1 of 1 |
| APPLICATION NO. | : 14/128977 | |
| DATED | : May 5, 2015 | |
| INVENTOR(S) | : Francis Aaron et al. | |

It is certified that error appears in the above-identified patent and that said Letters Patent is hereby corrected as shown below:

Title page, Column 2,
Abstract, Line 5 reads "data containing an identifier of said user: said user identifier is" and should read -- data containing an identifier of said user; said user identifier is --.

In the Specification:

Column 4,
Line 1 reads "de activation of the" and should read -- deactivation of the --.

Column 9,
Line 27 reads "corresponding to the memory location of valid use identifier" and should read -- corresponding to the memory location of valid user identifier --.

In the Claims:

Claim 13, Column 12,
Line 52 reads "A installation comprising" and should read -- An installation comprising --.

Claim 17, Column 13,
Line 2 reads "one signal in triggers ,eans for locking or unlocking the" and should read -- one signal triggers means for locking or unlocking the --.

Signed and Sealed this
Sixth Day of October, 2015

Michelle K. Lee
*Director of the United States Patent and Trademark Office*